(12) United States Patent
Zhou

(10) Patent No.: US 10,523,464 B2
(45) Date of Patent: Dec. 31, 2019

(54) MULTI-HOMED ACCESS

(71) Applicant: Hewlett Packard Enterprise Development LP, Houston, TX (US)

(72) Inventor: Wan Zhou, Beijing (CN)

(73) Assignee: Hewlett Packard Enterprise Development LP, Houston, TX (US)

(*) Notice: Subject to any disclaimer, the term of this patent is extended or adjusted under 35 U.S.C. 154(b) by 148 days.

(21) Appl. No.: 15/309,343

(22) PCT Filed: May 5, 2015

(86) PCT No.: PCT/CN2015/078262
§ 371 (c)(1),
(2) Date: Nov. 7, 2016

(87) PCT Pub. No.: WO2015/169206
PCT Pub. Date: Nov. 12, 2015

(65) Prior Publication Data
US 2017/0078115 A1      Mar. 16, 2017

(30) Foreign Application Priority Data

May 5, 2014   (CN) .......................... 2014 1 0186598

(51) Int. Cl.
| | | |
|---|---|---|
| H04L 12/46 | (2006.01) | |
| H04L 12/709 | (2013.01) | |
| H04L 12/715 | (2013.01) | |
| H04L 12/721 | (2013.01) | |

(52) U.S. Cl.
CPC ........ *H04L 12/4633* (2013.01); *H04L 45/245* (2013.01); *H04L 45/64* (2013.01); *H04L 45/66* (2013.01)

(58) Field of Classification Search
CPC ............. H04L 12/4633; H04L 12/6418; H04L 45/245; H04L 45/64; H04L 45/66
See application file for complete search history.

(56) References Cited

U.S. PATENT DOCUMENTS

| | | | |
|---|---|---|---|
| 2014/0006585 | A1 | 1/2014 | Dunbar et al. |
| 2014/0086253 | A1 | 3/2014 | Yong |
| 2015/0026344 | A1* | 1/2015 | Ravinoothala ........ H04L 47/125 709/226 |
| 2015/0234668 | A1* | 8/2015 | Ravinoothala ...... G06F 9/45558 718/1 |

FOREIGN PATENT DOCUMENTS

| | | |
|---|---|---|
| CN | 101039227 A | 9/2007 |
| CN | 101039277 A | 9/2007 |
| CN | 101170512 A | 4/2008 |
| CN | 101247299 A | 8/2008 |

OTHER PUBLICATIONS

International Search Report and Written Opinion, International Application No. PCT/CN2015/078262, dated Jul. 29, 2015, pp. 1-8, SIPO.
Marc Lasserre et al., "Framework for DC Network Virtualization," Jul. 4, 2013, pp. 1-28, Internet Draft, IETF Trust.
International Preliminary Report on Patentability received for PCT Patent Application No. PCT/CN2015/078262, dated Nov. 17, 2016, 5 pages.

* cited by examiner

Primary Examiner — Eric Myers

(57) ABSTRACT

A network virtualization authority (NVA) device generates a virtual network virtualization edge (NVE) device for members of a link aggregation group and assigns an internet protocol (IP) address to the virtual NVE.

18 Claims, 5 Drawing Sheets

MULTI-HOMED ACCESS

BACKGROUND

In a data center network, virtualization applications of a server are more widely popular. A physical server may be virtualized into a plurality of virtual machines (VM). By using virtualization technology a data center may provide data escrow and other services for a plurality of different tenants. Tenants may be the resource users of the data center, for example corporations or others that store data and/or applications in the data center. Data escrow is the storage of data by a neutral third party. To ensure the safety of data escrow of tenants, virtual networks may be used to isolate traffic relating to different tenants. Thus, a plurality of virtual networks may be set up over the internal physical network of the data center.

To achieve the object of the internal physical network of the data center being divided into different virtual networks, the existing technology provides the Network Virtualization Over Layer3 (NVO3). NVO3 technology is an overlay technology. By using the channel encapsulation technology, the packet of the virtual network may be performed the channel encapsulation. Thus different virtual networks may be distinguished through a different virtual network identifier. The NVO3 technology may use Media Access Control in Internet Protocol (MAC in IP) channel encapsulation technology. The NVO3 may for example use a 24-bits virtual network identifier, so that the tenants may create isolated virtual network with a maximum number of 16M.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

In the NVO3 protocol, it may define a network virtualization edge (NVE) device which responses to connect and manage a tenant terminal system. In the data center, the tenant terminal system may be a host, for example, a VM, a physical computer, or a server. The packet sent from the tenant terminal system may be first forwarded to the NVE device to search a MAC forwarding table. If the packet may be determined to forward across the IP network, the NVE device may perform an OVERLAY-encapsulation on the packet, wherein the out layer destination IP address of the OVERLAY-encapsulation packet is the IP address of a NVE device located on another side of the channel. According to the out layer destination IP address, the OVERLAY-encapsulation packet may forward hop by hop to the destination NVE device. The destination NVE device may de-capsulate the OVERLAY-encapsulation packet and send the original packet to a destination tenant terminal system.

In the current implementation, the NVE devices may be centralized managed and controlled by a network virtualization authority (NVA) device. However, in the current NVO3 protocol, it may not define multi-homed access for the terminal system which is connected to the NVE device. Thus, the NVE device may not support communication connection and deployment of the multi-homed access for the terminal system. That is, it may not allow the same terminal system through the multi-homed access to connect the plurality of NVE devices. Therefore, it may not make full use of a plurality of data channels between the terminal system and the NVE devices.

In the present disclosure, the term "host" refers to servers, virtual machines (VM), physical computers, and the like, which may be given multi-homed access to a data center network. The data center network may be an overlay network or other networks, etc.

Figure 1:
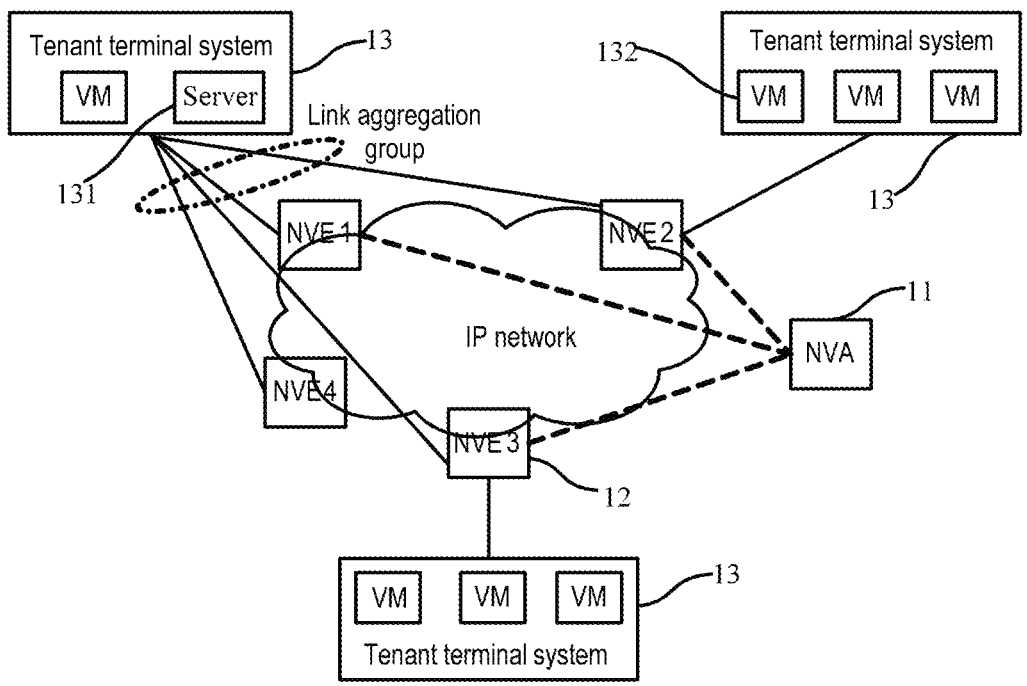
FIG. 1 is a schematic view of a network structure of a data center of NVO3, according to an example of the present disclosure.
Figure 2:
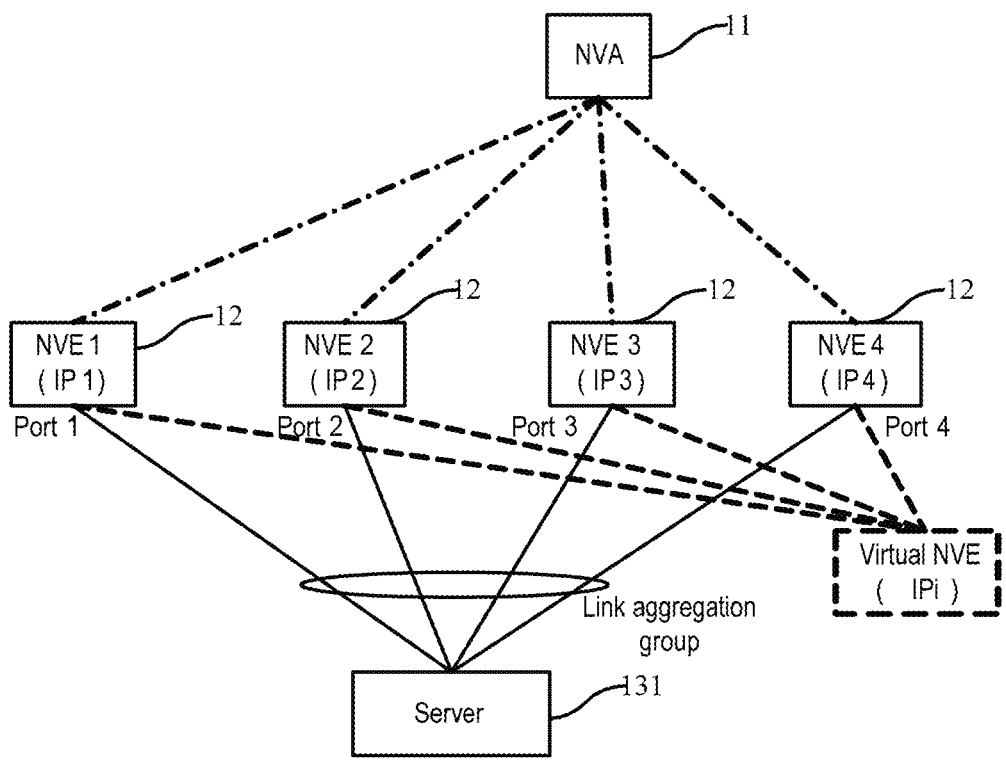
FIG. 2 is a networking schematic view of a multi-homed access overlay network, according to an example of the present disclosure.

The following may use multi-homed access of a server located in an overlay network as an example to illustrate the present disclosure. Please refer to FIG. 1 and FIG. 2, in certain application scenarios, FIG. 1 and FIG. 2 may respectively show schematic views of a network structure of multi-homed access, wherein the network structure is an overlay network and a server may be designed as a host in the overlay network. As shown in FIG. 1 and FIG. 2, the overlay network may comprise a network virtualization authority (NVA) device 11 for managing and controlling a plurality of network virtualization edge (NVE) devices 12, four NVE devices which are NVE1, NVE2, NVE3, and NVE4, and tenant terminal system 13 which may comprise at least one server 131. It should be noted that FIG. 2 is a simplified structure of FIG. 1. The server described in FIG. 2 may be a host of the tenant terminal system 13 which could include more other hosts, such as the VM 132 described in FIG. 1. In order to achieve high reliability and load balancing of traffic between the server and NVE devices, the four NVE devices may be designed as the multi-homed access device. Thus, that the server may simultaneously access the four NVE devices to the multi-homed access of the overlay network. In the existing technology, the NVE device may not support the multi-homed access network of the server.

In this example, the port of each NVE device connected to the server may be added to a same link aggregation group. The connection links between the server and the four NVE devices may be the member links of the link aggregation group. A downstream port of a NVE device may be defined as the port which is connected to the server through the member link of the link aggregation group. For example, the port 1 of the NVE1 connected to the server, the port 2 of the NVE2 connected to the server, the port 3 of the NVE3 connected to the server, and the port 4 of the NVE 4 connected to the server may be the downstream port.

In practical application, when the host is a physical computer, the networking structure is same as the aforementioned networking structure. When the host is a VM, the networking structure is similar to the aforementioned networking structure, except that, the port of the NVE device that is connected to the VM is a virtual port.

Further, according to the networking shown in FIG. 1 and FIG. 2 and using the following operations, the server may perform the multi-homed access to the overlay network formed by the NVA device and the NVE devices.

It may configure the same domain identifier (ID) on the downstream ports of NVE 1, NVE 2, NVE 3, and NVE 4 which are connected to the server. The domain ID identifier may represent that the four NVE devices may separately connect to the same device, i.e. the server shown in FIG. 2, by different member link of the same link aggregation group. In a practical application, According to the link aggregation group, the NVA device may assign a domain ID for NVE 1, NVE 2, NVE 3, and NVE 4, and distribute the domain ID to the downstream ports of NVE 1, NVE 2, NVE 3, and NVE 4 which are connected to the server. After receiving the distributed domain ID, NVE 1, NVE 2, NVE 3, and NVE 4 may respectively configure the domain ID to its downstream port connected to the server.

The NVA device may generate a virtual network virtualization edge (NVE) device for the link aggregation group and assign a corresponding internet protocol (IP) address which is denoted as IPi. The NVA device may distribute the assigned IP address IPi to the downstream ports of NVE 1, NVE 2, NVE 3, and NVE 4 which are connected to the server. After receiving the assigned IP address, NVE 1, NVE 2, NVE 3, and NVE 4 may respectively configure the assigned IP address IPi to its downstream port connected to the server. At this moment, each of the NVE devices may have its own IP address and also have the assigned IP address. That is, NVE1 may have its own IP address IP1 and also have the assigned IP address IPi. NVE1 may use IPi to do OVERLAY-encapsulation for the server or VM described in FIG. 1 and FIG. 2 and may also use its own IP address in communicating with other device, such as NVA or other network device. NVE 2, NVE 3, and NVE 4 are in the same situation. That means NVE1, NVE 2, NVE 3, and NVE 4 may provide the same service to the server 132 by using same IPi.

Any one of the plurality of NVE devices NVE 1, NVE 2, NVE 3, and NVE 4 in its downstream port may receive an Ethernet packet which is sent from the server. An Ethernet packet may be forwarded through an egress port (also called as "an output port") transparently. If the Ethernet packet may be determined to forward across the IP network, the NVE device may performs an OVERLAY-encapsulation on the Ethernet packet to generate an OVERLAY-encapsulated packet and send to an IP backbone network, wherein a source IP address of the OVERLAY-encapsulated packet is the assigned IP address, i.e. the IP address of the virtual NVE device. The OVERLAY-encapsulation may make the Ethernet packet carried in OVERLAY-encapsulated packet transparently across the IP network without been modified, which achieved an equal Ethernet switching function and make the IP network just like an Ethernet cable for the Ethernet packet.

The following description may use NVE1 as an example to illustrate the present disclosure.

In the existing technology, a virtual network instance (VNI) may represent a virtual network which has a corresponding VNI identifier. The VNI identifier may be a VNI unicast identifier or a VNI multicast identifier. The VNI unicast identifier may be used for forwarding the unicast packet, and The VNI multicast identifier may be used for forwarding the multicast packet. Typically, in the port, each virtual local area network (VLAN) may be classified into different virtual networks and be deployed with corresponding VNI information. For example, port 1 may be configured with VLAN1 to VLAN5. VLAN1 to VLAN3 may be classified into a virtual network corresponding to VNI 1 and be deployed with corresponding VNI information of VNI 1. VLAN4 to VLAN5 may be classified into another virtual network corresponding to VNI 2 and be deployed with corresponding VNI information of VNI 2. When an Ethernet packet is received, based on the port which receives the Ethernet packet and the VLAN which the received Ethernet packet belongs to, the corresponding VNI may be determined. Thus, the received Ethernet packet may be encapsulated and forwarded according the corresponding VNI information.

NVE1 may receive, in its downstream port which is connected to the server, an Ethernet packet which may be forwarded from the server, and determine the corresponding NVI based on the port which is the downstream port of NVE1 and the VLAN corresponding to the received Ethernet packet. NVE 1 may perform the following process based on the type of the received Ethernet packet.

(1) Ethernet Packet is a Known Unicast Packet.

When the Ethernet packet which is received form the downstream port of NVE1, which is sent from the server, and which is a known unicast packet, NVE1 may search a unicast MAC forwarding table to find a forwarding table entry corresponding to a destination MAC address of the Ethernet packet, wherein the unicast MAC forwarding table is corresponding to the VNI. NVE 1 may further perform the following process based on the content of the found forwarding table entry.

(A1) A out port information of the forwarding table entry may be a physical port which indicates that the Ethernet packet may be forwarded in local. NVE1 may forward the Ethernet packet through the out port, wherein the forwarding processes may be the existing technology.

(A2) A out port information of the forwarding table entry may include an IP address of a remote NVE which indicates that the Ethernet packet may be forwarded through the IP network. According to the VNI, NVE 1 may perform an OVERLAY-encapsulation on the Ethernet packet to generate an OVERLAY-encapsulation packet. The source IP address of the OVERLAY-encapsulation packet is the IP address IPi of the virtual NVE. The destination IP address of the OVERLAY-encapsulation packet is the IP address in the forward table entry. NVE 1 may send the OVERLAY-encapsulation packet to an IP backbone network. Finally, the OVERLAY-encapsulation packet may be forwarded to the remote NVE.

Here, the operation of the OVERLAY-encapsulation may use the IP address IPi of the virtual NVE device to be the source IP address of the OVERLAY-encapsulation packet, use the IP address of the remote NVE device recorded in the forwarding table entry to be the destination IP address of the OVERLAY-encapsulation packet, and use the VNI unicast identifier which is used for forwarding the unicast packet and is corresponding to the VNI to be the virtual identifier of the OVERLAY-encapsulation packet.

(2) Ethernet Packet is a Known Multicast Packet.

When the Ethernet packet which is received form the downstream port of NVE1, which is sent from the server, and which is a known multicast packet, NVE1 may search a multicast MAC forwarding table to find a forwarding table entry corresponding to a destination MAC address of the Ethernet packet, wherein the multicast MAC forwarding table is corresponding to the VNI. NVE 1 may further perform the following process based on the content of the found forwarding table entry.

(B1) A out port information of the forwarding table entry may comprise a physical port or a plurality of physical ports which indicates that the Ethernet packet may be forwarded in local. NVE1 may forward the Ethernet packet through the out port or the plurality of out ports, wherein the forwarding processes may be the existing technology, and thus a detailed description therefor is deemed unnecessary.

(B2) The out port information of the forwarding table entry may include an IP address of a remote NVE which indicates that the Ethernet packet may be forwarded through the IP network. NVE 1 may perform an OVERLAY-encapsulation on the Ethernet packet to generate an OVERLAY-encapsulation packet. The source IP address of the OVERLAY-encapsulation packet is the IP address IPi of the virtual NVE. The destination IP address of the OVERLAY-encapsulation packet is the multicast address of the VNI. NVE 1 may send the OVERLAY-encapsulation packet to an IP backbone network. Finally, the OVERLAY-encapsulation packet may be forwarded to all the remote NVEs of the receiver of a multicast group.

(3) Ethernet Packet is an Unknown Unicast Packet, an Unknown Multicast Packet, or a Broadcast Packet.

When the Ethernet packet which is received form the downstream port of NVE1, which is sent from the server, and which is an unknown unicast packet, an unknown multicast packet, or a broadcast packet, NVE1 may flood the Ethernet packet in multicasting to all the NVE devices of the VNI.

In this example, NVE 1 may perform an OVERLAY-encapsulation on the Ethernet packet to generate an OVERLAY-encapsulation packet for the aforementioned three type packet. The source IP address of the OVERLAY-encapsulation packet is the IP address IPi of the virtual NVE. The destination IP address of the OVERLAY-encapsulation packet is the multicast address of the VNI. NVE 1 may send the OVERLAY-encapsulation packet to an IP backbone network. Finally, the OVERLAY-encapsulation packet may be forwarded to all the remote NVEs of the receiver of a multicast group.

The aforementioned operation of the OVERLAY-encapsulation may use the IP address IPi of the virtual NVE device to be the source IP address of the OVERLAY-encapsulation packet, use the multicast address of the VNI to be the destination IP address of the OVERLAY-encapsulation packet, and use the VNI identifier which is used for forwarding the multicast packet and is corresponding to the VNI to be the virtual identifier of the OVERLAY-encapsulation packet.

It should be noted that, in the aforementioned (1), (2), and (3) case, the remote NVE of NVE1 may be NVE2, NVE3, NVE4, or the other NVE.

Any one of NVE1, NVE2, NVE3, and NVE4 may receive an OVERLAY-encapsulated packet from the IP backbone network. According to the source IP address and the destination address of the received OVERLAY-encapsulated packet, the NVE device may process the received OVERLAY-encapsulated packet in different way.

The following description may use NVE1 as an example to illustrate the present disclosure.

NVE1 may receive an OVERLAY-encapsulated packet from the IP backbone network. NVE 1 may perform the following process based on the source IP address and the destination address of the received OVERLAY-encapsulated packet.

(4) The Source IP Address of the Received OVERLAY-Encapsulated Packet is the Unicast IP Address IPi of the Virtual NVE Device.

If the source IP address of the received OVERLAY-encapsulated packet is the IP address IPi of the virtual NVE device, it may indicate that the received OVERLAY-encapsulated packet is sent out from NVE1, NVE2, NVE3, or NVE4 and the received OVERLAY-encapsulated packet has already been forwarded. Thus, NVE 1 may not perform processing for the received OVERLAY-encapsulated packet, and discard the received OVERLAY-encapsulated packet.

(5) The Destination IP Address of the Received OVERLAY-Encapsulated Packet is the Unicast IP Address IPi of the Virtual NVE Device.

If the destination IP address of the received OVERLAY-encapsulated packet is the IP address IPi of the virtual NVE device, it may indicate that the received OVERLAY-encapsulated packet is sent from a remote NVE in unicast and the received OVERLAY-encapsulated packet is sent to the downstream port of NVE1, in which the downstream port of NVE1 is configured with the IP address IPi. NVE 1 may de-capsulate the received OVERLAY-encapsulated packet to obtain a VNI information and an original Ethernet packet, and forward the original Ethernet packet to the server through the downstream port of NVE 1.

(6) The Destination IP Address of the Received OVERLAY-Encapsulated Packet is a Multicast Address of a VNI.

If the destination IP address of the received OVERLAY-encapsulated packet is a multicast address of a VNI, it may indicate that the received OVERLAY-encapsulated packet is sent by a remote NVE in multicast. NVE 1 may de-capsulate the received OVERLAY-encapsulated packet to obtain a VNI information and an original Ethernet packet, and forward the original Ethernet packet based on the VNI information.

The forwarding method of the original Ethernet packet based on the VNI information may describe as follow. If the original Ethernet packet is a unicast packet, NVE1 may search a unicast MAC forwarding table to find a forwarding table entry corresponding to a destination MAC address of the original Ethernet packet, wherein the unicast MAC forwarding table is corresponding to the VNI. If the forwarding table entry is found, NVE 1 may forward the original Ethernet packet through an out port of the found forwarding table entry. If the forwarding table entry is not found, NVE 1 may flood the original Ethernet packet. If the original Ethernet packet is a multicast packet, NVE1 may search a multicast MAC forwarding table to find a forwarding table entry corresponding to a destination MAC address of the original Ethernet packet, wherein the multicast MAC forwarding table is corresponding to the VNI. If the forwarding table entry is found, NVE 1 may forward the original Ethernet packet through all out ports of the found forwarding table entry. If the forwarding table entry is not found, NVE 1 may flood the original Ethernet packet. If the original Ethernet packet is a broadcast packet, NVE 1 may flood the original Ethernet packet.

As shown in FIG. 1 and FIG. 2, through the four different member links of the same link aggregation group, the server may connect to NVE1, NVE2, NVE3, and NVE 4, respectively. According the characteristic of link aggregation group, each NVE device may learn a first MAC address from its downstream port, and synchronize the first MAC address to the downstream ports of other three NVE device, so that each of NVE1, NVE2, NVE3, and NVE 4 may learn the same MAC address in its own downstream port. Each NVE device may receive an Ethernet packet with its destination MAC address being same as the first MAC address, and forward the Ethernet packet through its downstream port.

The MAC address synchronization process may be realized by the NVA device. Any NVE device may learn a first MAC address from its downstream port and send a MAC address information to the NVA device, wherein the MAC address information may comprise the first MAC address and a domain ID which is configured in the downstream port of any NVE device. According to the domain ID, the NVA device may find the other three NVE devices with downstream ports being configured with the same domain ID. The NVA device may distribute the MAC address information to the other three NVE devices. After receiving the MAC address information, the other three NVE devices may learn the first MAC address in the MAC address information to the corresponding downstream ports, respectively.

The first MAC address which is learned from the downstream port of a NVE device may be a unicast MAC address, wherein the first MAC address is a source MAC address of a unicast packet. The first MAC address may be a multicast MAC address, wherein the first MAC address is learned as a multicast packet being received. According to the type of the first MAC address, the NVE device may learn the first MAC address to its downstream port in different way. When the first MAC address is the unicast MAC address, the NVE device learns the first MAC address to its downstream port is to generate a unicast forwarding table entry. The destination MAC address of the unicast forwarding table entry is the first MAC address, and the out port of the unicast forwarding table entry is the downstream port of the NVE device. When the first MAC address is the multicast MAC address, the NVE device learns the first MAC address to its downstream port is to add the downstream port of the NVE device to a multicast MAC forward table entry corresponding to the first MAC address.

The aforementioned may describe the principle of the multi-homed access of the present disclosure. The present disclosure may also provide a multi-homed access method which is used in a network virtualization edge (NVE) device and a multi-homed access method which is used in a network virtualization authority (NVA) device. The present disclosure may also provide a multi-homed access network virtualization edge (NVE) device and a multi-homed access network virtualization authority (NVA) device. The multi-homed access method which is used in a network virtualization edge (NVE) device, the multi-homed access method which is used in a network virtualization authority (NVA) device, the multi-homed access network virtualization edge (NVE) device, and the multi-homed access network virtualization authority (NVA) device may disclose in FIG. 3 to FIG. 8, respectively.

Figure 3:
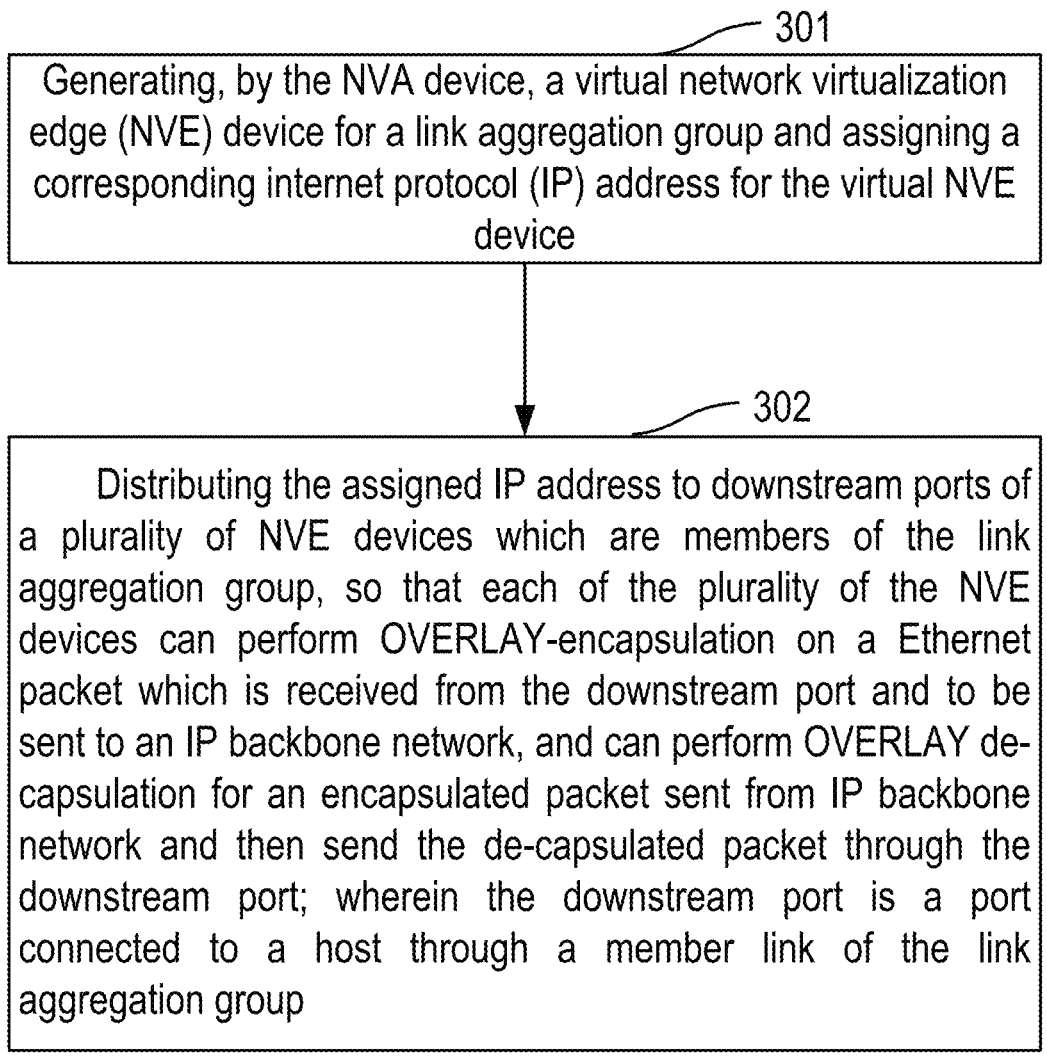
FIG. 3 is a flowchart of a multi-homed access method which is executed on a network virtualization edge (NVE) device, according to an example of the present disclosure.

FIG. 3 is a flowchart of a multi-homed access method. The method may be applied to a network which comprises a NVA device, and a plurality of NVE devices connected to the same host, wherein the host may be a server, a VM, or a physical computer. The host may connect to the plurality of NVE devices through different member kinks of the same link aggregation group.

In block 301, the NVA may generate a virtual network virtualization edge (NVE) device for the link aggregation group and assign a corresponding internet protocol (IP) address.

In block 302, the NVA may distribute the assigned IP address to downstream ports of the plurality of NVE devices (which are members of the link aggregation group). Each of the plurality of the NVE devices can perform OVERLAY-encapsulation on an Ethernet packet which is received from the downstream port and to be sent to an IP backbone network, and perform OVERLAY de-capsulation for an encapsulated packet sent from IP backbone network and then send the de-capsulated packet through the downstream port. Here, Each of the plurality of NVE devices in its downstream port may receive an Ethernet packet which is forwarded through an IP network. Each of the plurality of NVE devices may perform an OVERLAY-encapsulation on the Ethernet packet and send the OVERLAY-encapsulation packet to an IP backbone network, wherein a source IP address of the OVERLAY-encapsulated packet is the assigned IP address. Each of the plurality of NVE devices may receive an OVERLAY-encapsulated packet from the IP backbone network, determine that a destination IP address of the received OVERLAY-encapsulated packet is the assigned IP address, de-capsulate the received OVERLAY-encapsulated packet to obtain an original Ethernet packet, and forward the original Ethernet packet through its downstream port.

The downstream port is a port of each of the plurality of NVE devices that is connected to the host through a member link of the link aggregation group.

When a first NVE devices learns a first MAC address from its downstream port, then the NVA device may synchronize the first MAC address to the downstream ports of the other NVE devices of the plurality of NVE devices, so that each of the plurality of NVE devices in its downstream port learns the same MAC address and each of the plurality of NVE devices forwards an Ethernet packet through its downstream port in which a destination MAC address of the Ethernet packet is same as the first MAC address.

According to the link aggregation group, the NVA device may pre-assign a domain identifier for the plurality of NVE device, and distribute the domain identifier to each of the downstream port of the plurality of NVE devices.

The NVA device may perform the following operations for synchronizing the first MAC address to the downstream ports of the other NVE devices of the plurality of NVE devices. The NVA device may receive a MAC address information in its downstream port, wherein the first NVE device learns a first MAC address from its downstream port and generates the MAC address information to notify the NVA device. The NVA device may search the other NVE devices to find NVE devices whose domain identifier is same as the domain identifier of the first NVE device, and distribute the MAC address information to downstream ports of the found NVE devices.

Figure 4A:
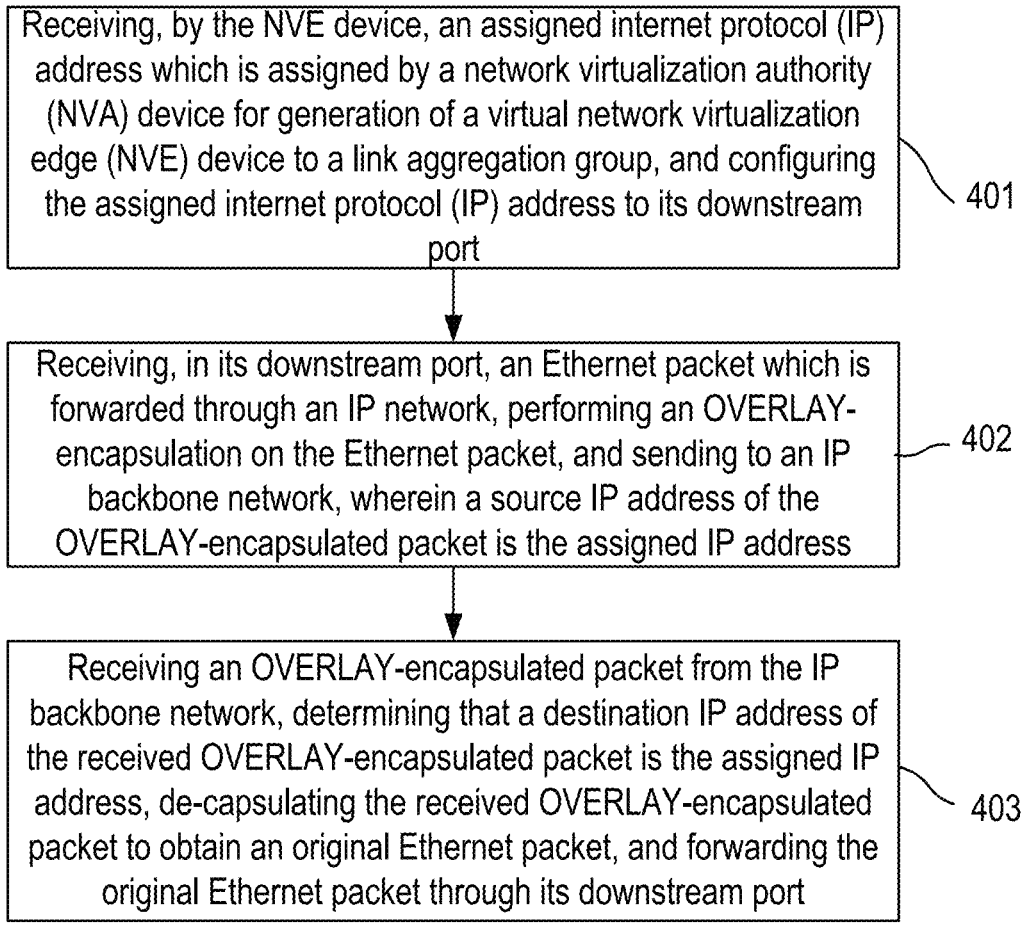
FIG. 4A is a flowchart of a multi-homed access method which is executed on a network virtualization authority (NVA) device (or a network virtualization edge (NVE) device), according to an example of the present disclosure.

FIG. 4A is another flowchart of a multi-homed access method. The method may be applied to a network which comprises a NVA device, and a plurality of NVE devices connected to the same host, wherein the host may be a server, a VM, or a physical computer. The host may connect to the plurality of NVE devices through different member kinks of the same link aggregation group.

In block 401, the NVE device may receive an assigned internet protocol (IP) address which is assigned by a network virtualization authority (NVA) device to a virtual network virtualization edge (NVE) device, wherein the NVA device generates the virtual NVE device for a link aggregation group, and configure the assigned internet protocol (IP) address to its downstream port.

In block 402, the NVE device may receive, in its downstream port, an Ethernet packet which is forwarded through an IP network, perform an OVERLAY-encapsulation on the Ethernet packet, and send to an IP backbone network, wherein a source IP address of the OVERLAY-encapsulated packet is the assigned IP address.

Figure 4B:
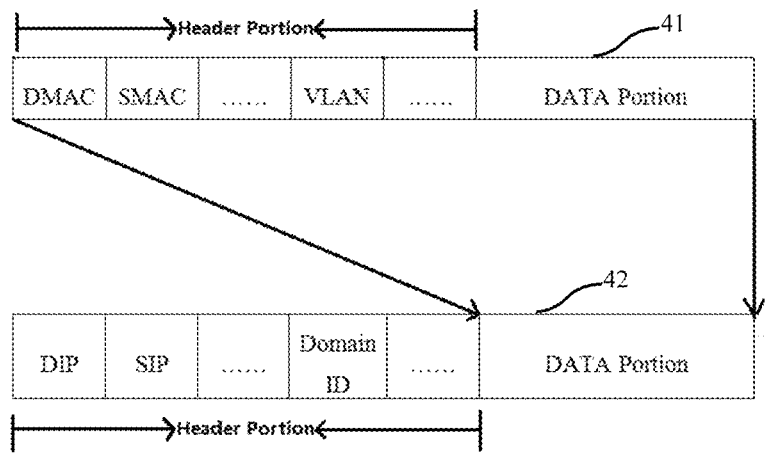
FIG. 4B is the format of packets which illustrates the relationship between an Ethernet packet and an OVERLAY encapsulated packet.

Referring to FIG. 4B, an Ethernet packet 41 may include header portion and data portion for carrying data, such as an IP packet or other level 3 packet. The header portion may include destination MAC address (DMAC), source MAC address (SMAC), VLAN and other content. The Ethernet packet 41 may be encapsulated to an OVERLAY encapsulated packet 42 by adding a further header portion. After that, the Ethernet packet 41 will be in a data portion of the OVERLAY encapsulated packet 42. The OVERLAY encapsulated packet 42 may also include a header portion comprising destination IP address (DIP), source IP address, such as IPi, and Domain ID. This OVERLAY encapsulated packet 42 could also be de-capsulated into the original Ethernet packet by removing the header portion of the OVERLAY encapsulated packet 42.

In block 403, the NVE device may receive an OVERLAY-encapsulated packet from the IP backbone network, determine that a destination IP address of the received OVERLAY-encapsulated packet is the assigned IP address, de-capsulate the received OVERLAY-encapsulated packet to obtain an original Ethernet packet, and forward the original Ethernet packet through its downstream port.

The downstream port is a port of each of the plurality of NVE devices that is connected to a host through a member link of the link aggregation group.

Before de-capsulating the received OVERLAY-encapsulated packet to obtain a virtual network instance (VNI) information and an original Ethernet packet, the NVE device may determine that a destination IP address of the received OVERLAY-encapsulated packet is same as the assigned IP address. In response to the determination, the NVE device may discard the received OVERLAY-encapsulated packet.

After receiving the Ethernet packet form its downstream port, the NVE device may perform the following operations for performing the OVERLAY-encapsulation on the Ethernet packet.

According to the port which receives the Ethernet packet and the VLAN which the received Ethernet packet belongs to, the VNE device may determine the corresponding VNI.

If the received Ethernet packet is a known unicast packet, the NVE device may search a unicast MAC forwarding table to find a forwarding table entry corresponding to a destination MAC address of the Ethernet packet, wherein the unicast MAC forwarding table is corresponding to the VNI. According to the VNI, the NVE device may perform an OVERLAY-encapsulation on the Ethernet packet to generate an OVERLAY-encapsulation packet. The source IP address of the OVERLAY-encapsulation packet is the assigned IP address of the virtual NVE. The destination IP address of the OVERLAY-encapsulation packet is the IP address in the forward table entry.

If the Ethernet packet is an unknown unicast packet, a multicast packet, or a broadcast packet, the NVE device may perform, according to the VNI, an OVERLAY-encapsulation on the Ethernet packet to generate an OVERLAY-encapsulation packet. The source IP address of the OVERLAY-encapsulation packet is the assigned IP address of the virtual NVE. The destination IP address of the OVERLAY-encapsulation packet is the multicast address of the VNI.

If the destination IP address of the OVERLAY-encapsulated packet received from the IP backbone network is a multicast address of a VNI, the NVE device may de-capsulate the received OVERLAY-encapsulated packet to obtain a VNI information and an original Ethernet packet, and forward the original Ethernet packet based on the VNI information.

The NVE device may perform the following operation for forwarding the original Ethernet packet based on the VNI information.

If the original Ethernet packet is a unicast packet, the NVE device may search a unicast MAC forwarding table to find a forwarding table entry corresponding to a destination MAC address of the original Ethernet packet, wherein the unicast MAC forwarding table is corresponding to the VNI. If the forwarding table entry is found, the NVE device may forward the original Ethernet packet through an out port of the found forwarding table entry. If the forwarding table entry is not found, the NVE device may flood the original Ethernet packet.

If the original Ethernet packet is a multicast packet, the NVE device may search a multicast MAC forwarding table to find a forwarding table entry corresponding to a destination MAC address of the original Ethernet packet, wherein the multicast MAC forwarding table is corresponding to the VNI. If the forwarding table entry is found, the NVE device may forward the original Ethernet packet through all out ports of the found forwarding table entry. If the forwarding table entry is not found, the NVE device may flood the original Ethernet packet.

If the original Ethernet packet is a broadcast packet, the NVE device may flood the original Ethernet packet.

The NVE device may learn a first MAC address from its downstream port, and synchronize the first MAC address, through the NVA device, to the downstream ports of the other NVE devices of the plurality of NVE devices. Thus, the other NVE devices of the plurality of NVE devices may respectively forward an Ethernet packet through its downstream port in which a destination MAC address of the Ethernet packet is same as the first MAC address.

The NVE device may receive a second MAC address which is synchronized through the NVA device and which is learned from the other NVE devices of the plurality of NVE devices. The NVE device may learn the second MAC address to its downstream port, and forward an Ethernet packet through its downstream port in which a destination MAC address of the Ethernet packet is same as the second MAC address.

The first MAC address which is learned in the downstream port of the NVE device may be a unicast MAC address or a multicast MAC address.

The NVE device may perform the following operations for learning the second MAC address to its downstream port.

When the second MAC address is the unicast MAC address, the NVE device may generate a unicast forwarding table entry. The destination MAC address of the unicast forwarding table entry is the second MAC address, and the out port of the unicast forwarding table entry is the downstream port of the NVE device.

When the second MAC address is the multicast MAC address, the NVE device may add the downstream port of the NVE device to a multicast MAC forward table entry corresponding to the second MAC address.

Figure 5:
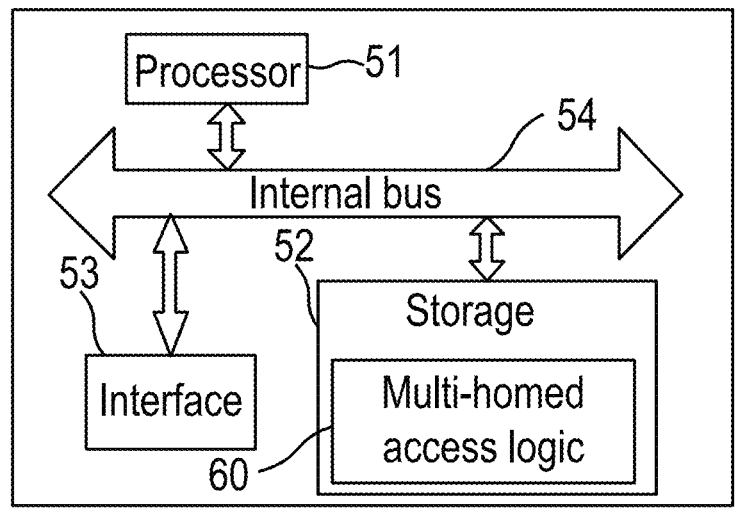
FIG. 5 is a schematic hardware structure diagram of a NVE device which executes multi-homed access logic, according to an example of the present disclosure.
Figure 6:
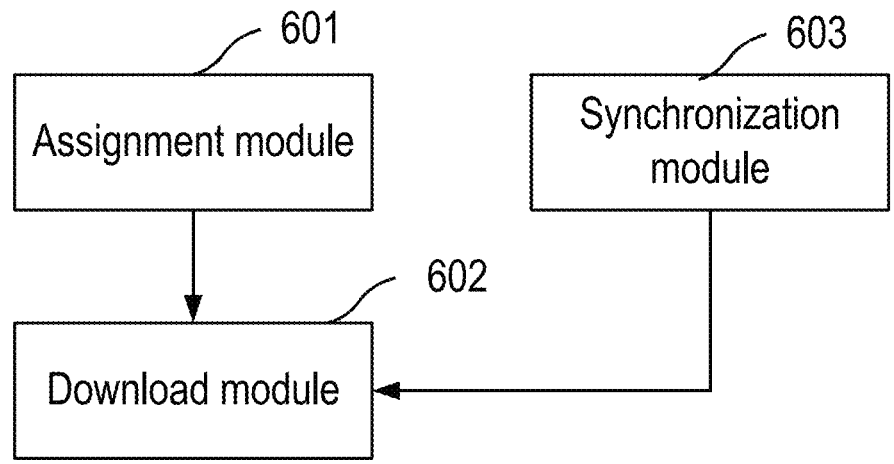
FIG. 6 is a schematic view of function modules of multi-homed access logic show in FIG. 5, according to an example of the present disclosure.

FIG. 5 is a schematic hardware structure diagram of a NVA device which executes multi-homed access logic corresponding to the method of FIG. 3, according to an example of the present disclosure. The device may be applied to a network which comprises the device itself, and a plurality of NVE devices connected to the same host, wherein the host may be a server, a VM, or a physical computer. The host may connect to the plurality of NVE devices through different member kinks of the same link aggregation group. As shown in FIG. 5, the device may comprise a processor such as a central processing unit (CPU) 51, a storage 52, an interface 53, and an internal bus 54, wherein NVA device may run a multi-homed access logic which is shown in FIG. 6. FIG. 6 is a schematic diagram of the function modules of the multi-homed access logic located in the device. As shown in FIG. 6, the multi-homed access logic may comprise an assignment module 601, a distribute module 602, and a synchronization module 603.

The assignment module 601 may generate a virtual network virtualization edge (NVE) device for a link aggregation group and assign a corresponding internet protocol (IP) address for the virtual NVE device.

The distribute module 602 may distribute the assigned IP address, which is assigned by the assignment module 601 to the virtual VNE device, to downstream ports of a plurality of NVE devices which are member of the link aggregation group, so that each of the plurality of NVE devices in its downstream port may receive an Ethernet packet which is forwarded through an IP network, perform an OVERLAY-encapsulation on the Ethernet packet and send the OVERLAY-encapsulation packet to an IP backbone network. Each of the plurality of NVE devices may receive an OVERLAY-encapsulated packet from the IP backbone network, determine that a destination IP address of the received OVERLAY-encapsulated packet is the assigned IP address, de-capsulate the received OVERLAY-encapsulated packet to obtain an original Ethernet packet, and forward the original Ethernet packet through its downstream port.

The downstream port is a port of each of the plurality of NVE devices that is connected to a host through a member link of the link aggregation group.

When a first NVE devices learns a first MAC address from its downstream port, then the synchronization module 603 may synchronize the first MAC address to the downstream ports of the other NVE devices of the plurality of NVE devices, so that each of the plurality of NVE devices in its downstream port learns the same MAC address and each of the plurality of NVE devices forwards an Ethernet packet through its downstream port, wherein a destination MAC address of the Ethernet packet is same as the first MAC address.

The assignment module 601 may pre-assign a domain identifier for the plurality of NVE device based on the link aggregation group.

The distribute module 602 may distribute the domain identifier, which is assigned by the assignment module 601, to each of the downstream port of the plurality of NVE devices.

The synchronization module 603 may receive a MAC address information in its downstream port, wherein the first NVE device learns a MAC address from its downstream port and generates the MAC address information. The synchronization module 603 may search the other NVE devices to find NVE devices whose domain identifier is same as the domain identifier of the first NVE device, and notify the distribute module 602 to distribute the MAC address information to downstream ports of the found NVE devices.

The following example is implemented in software to further describe the NVA device of the multi-homed access logic how to run the logic. In this example, the multi-homed access logic 60 is the instructions stored in the storage. When the NVA device runs the multi-homed access logic, the CPU of the NVA reads the multi-homed access logic 60 stored in the storage. The instructions of the function modules of the multi-homed access logic 60 are executed by CPU to cause the CPU to generate a virtual network virtualization edge (NVE) device for a link aggregation group, assign a corresponding internet protocol (IP) address for the virtual NVE device, and distribute the assigned IP address to downstream ports of a plurality of NVE devices which are members of the link aggregation group, so that each of the plurality of NVE devices in its downstream port receives an Ethernet packet which is forwarded through an IP network, each of the plurality of NVE devices performs an OVERLAY-encapsulation on the Ethernet packet and sends the OVERLAY-encapsulation packet to an IP backbone network, wherein a source IP address of the OVERLAY-encapsulated packet is the assigned IP address; and each of the plurality of NVE devices receives an OVERLAY-encapsulated packet from the IP backbone network, determines that a destination IP address of the received OVERLAY-encapsulated packet is the assigned IP address, de-capsulates the received OVERLAY-encapsulated packet to obtain an original Ethernet packet, and forwards the original Ethernet packet through its downstream port.

The downstream port is a port of each of the plurality of NVE devices that is connected to a host through a member link of the link aggregation group.

Further, when any one of the plurality of NVE devices learns a first MAC address from its downstream port, the instructions of the function modules of the multi-homed access logic 60 are executed by CPU to cause the CPU to synchronize the first MAC address to the downstream ports of the other NVE devices of the plurality of NVE devices, so that each of the plurality of NVE devices in its downstream port learns the same MAC address and each of the plurality of NVE devices forwards an Ethernet packet through its downstream port in which a destination MAC address of the Ethernet packet is same as the first MAC address.

Further, the instructions of the function modules of the multi-homed access logic 60 are executed by CPU to cause the CPU to pre-assign a domain identifier for the plurality of NVE device based on the link aggregation group, distribute the domain identifier to each of the downstream port of the plurality of NVE devices, receive a MAC address information in its downstream port, wherein the first NVE device learns a first MAC address from its downstream port and generates the MAC address information, search the other NVE devices to find NVE devices whose domain identifier is same as the domain identifier of the first NVE device, and distribute the MAC address information to downstream ports of the found NVE devices.

Figure 7:
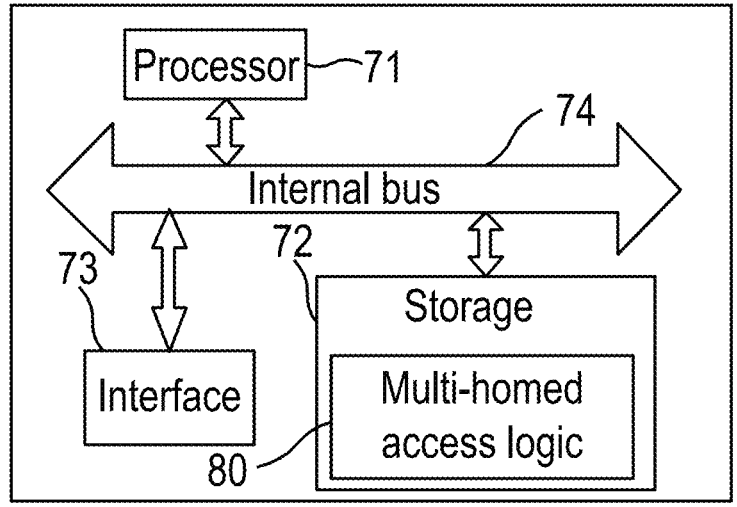
FIG. 7 is a schematic hardware structure diagram of a NVA device which executes multi-homed access logic, according to an example of the present disclosure.
Figure 8:
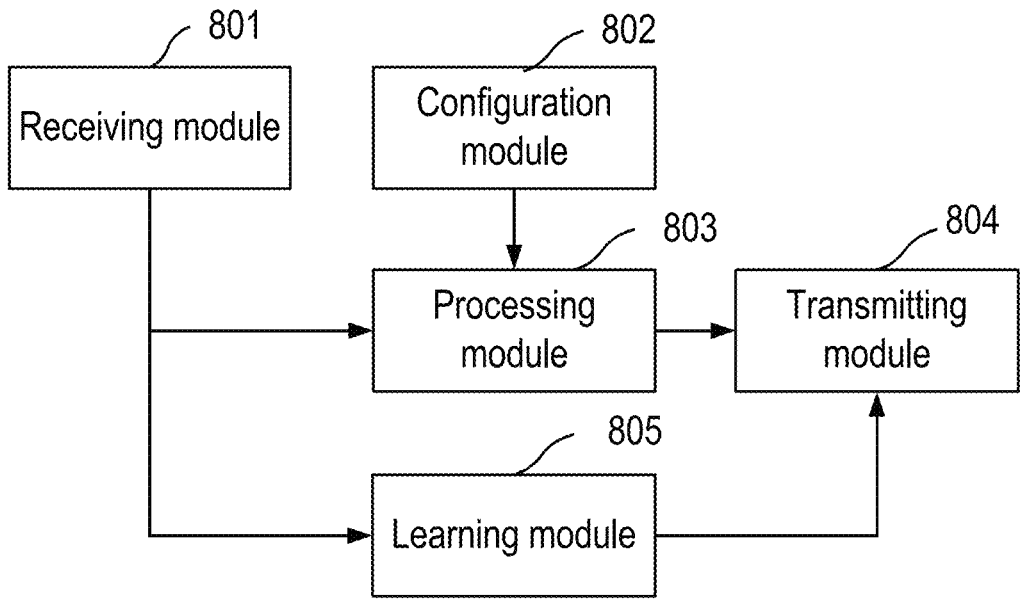
FIG. 8 is a schematic view of function modules of multi-homed access logic show in FIG. 7, according to an example of the present disclosure.

FIG. 7 is a schematic hardware structure diagram of a NVE device which executes multi-homed access logic corresponding to the method of FIG. 4, according to an example of the present disclosure. The device may be applied to a network which comprises a NVA device, and a plurality of NVE devices connected to the same host, wherein the host may be a server, a VM, or a physical computer. The host may connect to the plurality of NVE devices through different member kinks of the same link aggregation group. As shown in FIG. 7, the NVE device may comprise a central processing unit (CPU) 71, a storage 72, an interface 73, and an internal bus 74, wherein NVE device may run a multi-homed access logic which is shown in FIG. 8. FIG. 8 is a schematic diagram of the function modules of the multi-homed access logic located in the device. As shown in FIG. 8, the multi-homed access logic may comprise a receiving module 801, a configuration module 802, a processing module 803, a transmitting module 804, and a learning module 805.

The receiving module 801 may receive an assigned internet protocol (IP) address which is assigned by a network virtualization authority (NVA) device to a virtual network virtualization edge (NVE) device, wherein the NVA device generates the virtual NVE device for a link aggregation group. Through the downstream port of the NVE device, the receiving module 801 may receive an Ethernet packet which is forwarded through an IP network. The receiving module 801 may receive an OVERLAY-encapsulated packet from the IP backbone network.

The configuration module 802 may configure the assigned internet protocol (IP) address which is received by the receiving module 801 to the downstream port of the NVE device.

The processing module 803 may perform an OVERLAY-encapsulation on the Ethernet packet which is received by the receiving module 801, wherein a source IP address of the OVERLAY-encapsulated packet is the assigned IP address of the virtual NVE device. The processing module 803 may notify the transmitting module 804 to send the OVERLAY-encapsulated packet to an IP backbone network. The processing module 803 may determine that a destination IP address of the received OVERLAY-encapsulated packet, which is received by the receiving module 801, is the assigned IP address of the virtual NVE device, and de-capsulate the received OVERLAY-encapsulated packet to obtain an original Ethernet packet. The processing module 803 may notify the transmitting module 804 to send the original Ethernet packet through its downstream port.

The downstream port is a port of each of the plurality of NVE devices that is connected to a host through a member link of the link aggregation group.

Before de-capsulating the received OVERLAY-encapsulated packet to obtain a virtual network instance (VNI) information and an original Ethernet packet, the processing module 803 may determine that a destination IP address of the received OVERLAY-encapsulated packet is same as the assigned IP address, and discard the received OVERLAY-encapsulated packet.

According to the downstream port of the NVE device and the VLAN which the received Ethernet packet belongs to, the processing module 803 may determine the corresponding VNI.

If the received Ethernet packet is a known unicast packet, the processing module 803 may search a unicast MAC forwarding table to find a forwarding table entry corresponding to a destination MAC address of the Ethernet packet, wherein the unicast MAC forwarding table is corresponding to the VNI. According to the VNI, the processing module 803 may perform an OVERLAY-encapsulation on the Ethernet packet to generate an OVERLAY-encapsulation packet. The source IP address of the OVERLAY-encapsulation packet is the assigned IP address of the virtual NVE. The destination IP address of the OVERLAY-encapsulation packet is the IP address in the forward table entry.

If the Ethernet packet is an unknown unicast packet, a multicast packet, or a broadcast packet, the processing module 803 may perform, according to the VNI, an OVERLAY-encapsulation on the Ethernet packet to generate an OVERLAY-encapsulation packet. The source IP address of the OVERLAY-encapsulation packet is the assigned IP address of the virtual NVE. The destination IP address of the OVERLAY-encapsulation packet is the multicast address of the VNI.

If the processing module 803 determines that a destination IP address of a received OVERLAY-encapsulated packet, which is received by the receiving module 801, is a multicast group address of a virtual network instance (VNI), the processing module 803 may de-capsulate the received OVERLAY-encapsulated packet to obtain a virtual network instance (VNI) information and an original Ethernet packet. The processing module 803 may notify the transmitting module 804 to forward the original Ethernet packet according to the VNI information.

If the original Ethernet packet is a unicast packet, the transmitting module 804 may search a unicast MAC forwarding table to find a forwarding table entry corresponding to a destination MAC address of the original Ethernet packet, wherein the unicast MAC forwarding table is corresponding to the VNI. If the forwarding table entry is found, the transmitting module 804 may forward the original Ethernet packet through an out port of the found forwarding table entry. If the forwarding table entry is not found, the transmitting module 804 may flood the original Ethernet packet.

If the original Ethernet packet is a multicast packet, the transmitting module 804 may search a multicast MAC forwarding table to find a forwarding table entry corresponding to a destination MAC address of the original Ethernet packet, wherein the multicast MAC forwarding table is corresponding to the VNI. If the forwarding table entry is found, the transmitting module 804 may forward the original Ethernet packet through all out ports of the found forwarding table entry. If the forwarding table entry is not found, the transmitting module 804 may flood the original Ethernet packet.

If the original Ethernet packet is a broadcast packet, the transmitting module 804 may flood the original Ethernet packet.

The receiving module 801 may receive a second MAC address which is synchronized from the NVA device, wherein the second MAC address is learned from any one of the plurality of NVE devices.

The learning module 805 may learns a first MAC address from the downstream port of the NVE device, and notify the transmitting module 804. Through the NVA device, the transmitting module 804 may synchronize the first MAC address to the downstream ports of the other NVE devices of the plurality of NVE devices. Thus, the other NVE devices of the plurality of NVE devices may respectively forward an Ethernet packet through its downstream port in which a destination MAC address of the Ethernet packet is same as the first MAC address. The learning module 805 may learns a second MAC address, which is received from the receiving module 801, to the downstream port of the NVE device. When the receiving module 801 receives an Ethernet packet in which a destination MAC address of the Ethernet packet is same as the second MAC address, the learning module 805 may notify the transmitting module 804 to forward an Ethernet packet through the downstream port of the NVE device.

In the multi-homed access logic, the MAC address which is learned by the learning module 805 may be a unicast MAC address or a multicast MAC address.

When the learned MAC address is the unicast MAC address, the learning module 805 may generate a unicast forwarding table entry. The destination MAC address of the unicast forwarding table entry is the learned MAC address, and the out port of the unicast forwarding table entry is the downstream port of the NVE device. When the learned MAC address is the multicast MAC address, the learning module 805 may add the downstream port of the NVE device to a multicast MAC forward table entry corresponding to the first MAC address.

The following example is implemented in software to further describe the NVE device of the multi-homed access logic how to run the logic. In this example, the multi-homed access logic 80 is the instructions stored in the storage. When the NVE device runs the multi-homed access logic, the CPU of the NVE reads the multi-homed access logic 80 stored in the storage. The instructions of the function modules of the multi-homed access logic 80 are executed by CPU to cause the CPU to receive an assigned internet protocol (IP) address which is assigned by a network virtualization authority (NVA) device to a virtual network virtualization edge (NVE) device, wherein the NVA device generates the virtual NVE device for a link aggregation group, receive, in a downstream port of the NVE device, an Ethernet packet which is forwarded through an IP network, receive an OVERLAY-encapsulated packet from the IP backbone network.

The instructions of the function modules of the multi-homed access logic 80 are executed by CPU to cause the CPU to configure the assigned IP address to the downstream port of the NVE device.

After receiving an Ethernet packet, the instructions of the function modules of the multi-homed access logic 80 are executed by CPU to cause the CPU to perform an OVERLAY-encapsulation on the Ethernet packet and send to an IP backbone network, wherein a source IP address of the OVERLAY-encapsulated packet is the assigned IP address. After receiving an OVERLAY-encapsulated packet, the instructions of the function modules of the multi-homed access logic 80 are executed by CPU to cause the CPU to determine a destination IP address of the received OVERLAY-encapsulated packet is the assigned IP address, de-capsulate the received OVERLAY-encapsulated packet to obtain an original Ethernet packet, and forwards the original Ethernet packet through its downstream port.

The downstream port is a port of the NVE devices that is connected to a host through a member link of the link aggregation group.

Before de-capsulating the received OVERLAY-encapsulated packet to obtain a virtual network instance (VNI) information and an original Ethernet packet, the instructions of the function modules of the multi-homed access logic 80 are executed by CPU to cause the CPU to determine that a destination IP address of the received OVERLAY-encapsulated packet is same as the assigned IP address, and discard the received OVERLAY-encapsulated packet.

The instructions of the function modules of the multi-homed access logic 80 are executed by CPU to cause the CPU to determine the corresponding VNI based on the downstream port of the NVE device and the VLAN which the received Ethernet packet belongs to If the received Ethernet packet is a known unicast packet, the instructions of the function modules of the multi-homed access logic 80 are executed by CPU to cause the CPU to search a unicast MAC forwarding table to find a forwarding table entry corresponding to a destination MAC address of the Ethernet packet, wherein the unicast MAC forwarding table is corresponding to the VNI. According to the VNI, the instructions of the function modules of the multi-homed access logic 80 are executed by CPU to cause the CPU to perform an OVERLAY-encapsulation on the Ethernet packet to generate an OVERLAY-encapsulation packet. The source IP address of the OVERLAY-encapsulation packet is the assigned IP address of the virtual NVE. The destination IP address of the OVERLAY-encapsulation packet is the IP address in the forward table entry.

If the Ethernet packet is an unknown unicast packet, a multicast packet, or a broadcast packet, the instructions of the function modules of the multi-homed access logic 80 are executed by CPU to cause the CPU to perform, according to the VNI, an OVERLAY-encapsulation on the Ethernet packet to generate an OVERLAY-encapsulation packet. The source IP address of the OVERLAY-encapsulation packet is the assigned IP address of the virtual NVE. The destination IP address of the OVERLAY-encapsulation packet is the multicast address of the VNI.

After determining a destination IP address of a received OVERLAY-encapsulated packet is a multicast group address of a virtual network instance (VNI), the machine readable instructions are further to cause the CPU to de-capsulate the received OVERLAY-encapsulated packet to obtain a virtual network instance (VNI) information and an original Ethernet packet, and forward the original Ethernet packet according to the VNI information.

If the original Ethernet packet is a unicast packet, the machine readable instructions are further to cause the CPU to search a unicast MAC forwarding table to find a forwarding table entry corresponding to a destination MAC address of the original Ethernet packet, wherein the unicast MAC forwarding table is corresponding to the VNI. If the forwarding table entry is found, the machine readable instructions are further to cause the CPU to forward the original Ethernet packet through an out port of the found forwarding table entry. If the forwarding table entry is not found, the machine readable instructions are further to cause the CPU to flood the original Ethernet packet.

If the original Ethernet packet is a multicast packet, the machine readable instructions are further to cause the CPU to search a multicast MAC forwarding table to find a forwarding table entry corresponding to a destination MAC address of the original Ethernet packet, wherein the multicast MAC forwarding table is corresponding to the VNI. If the forwarding table entry is found, the machine readable instructions are further to cause the CPU to forward the original Ethernet packet through all out ports of the found forwarding table entry. If the forwarding table entry is not found, the machine readable instructions are further to cause the CPU to flood the original Ethernet packet.

If the original Ethernet packet is a broadcast packet, the machine readable instructions are further to cause the CPU to flood the original Ethernet packet.

The machine readable instructions are further to cause the CPU to receive a MAC address which is synchronized from the NVA device, wherein the MAC address is learned from any one of the plurality of NVE devices.

The NVE device may learn a first MAC address from its downstream port, the machine readable instructions are further to cause the CPU to synchronize the first MAC address, through the NVA device, to the downstream ports of the other NVE devices of the plurality of NVE devices. Thus, the other NVE devices of the plurality of NVE devices may respectively forward an Ethernet packet through its downstream port in which a destination MAC address of the Ethernet packet is same as the first MAC address. The machine readable instructions are further to cause the CPU to learn a received second MAC address to the downstream port of the NVE device and forward an Ethernet packet through the downstream port of the NVE device in which a destination MAC address of the Ethernet packet is same as the second MAC address of the downstream port.

The learned MAC address may be a unicast MAC address or a multicast MAC address.

When the second MAC address is the unicast MAC address, the machine readable instructions are further to cause the CPU to generate a unicast forwarding table entry. The destination MAC address of the unicast forwarding table entry is the second MAC address, and the out port of the unicast forwarding table entry is the downstream port of the NVE device. When the second MAC address is the multicast MAC address, the machine readable instructions are further to cause the CPU to add the downstream port of the NVE device to a multicast MAC forward table entry corresponding to the second MAC address.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or block, or group of elements, integers or blocks, but not the exclusion of any other element, integer or block, or group of elements, integers or blocks.

It will be appreciated by persons skilled in the art that numerous variations and/or modifications may be made to the above-described examples, without departing from the broad general scope of the present disclosure. The present examples are, therefore, to be considered in all respects as illustrative and not restrictive.

The invention claimed is:

1. A multi-homed access method, which is used in a network virtualization authority (NVA) device, comprising:
   controlling, by the NVA device, a set of network virtualization edge (NVE) devices based on a network layer virtualization protocol;
   generating, by the NVA device, a virtual NVE device for a link aggregation group and assigning an Internet protocol (IP) address for the virtual NVE device, wherein the link aggregation group comprises ports of a plurality of NVE devices in the set of NVE devices;
   distributing the IP address to the ports of the plurality of NVE devices in the link aggregation group, thereby allowing each of the plurality of the NVE devices to encapsulate an Ethernet packet, which is received from a port of the ports in the link aggregation group and to be sent to an IP backbone network, and de-capsulate an encapsulated packet sent from IP backbone network and send the de-capsulated Ethernet packet a port of the ports in the link aggregation group;
   wherein the ports in the link aggregation group are configured with the IP address.

2. The method of claim 1, further comprising:
   receiving, by the NVA device, a first media access control (MAC) address learned by a first NVE device of the plurality of NVE devices, wherein the first MAC address learned from a port in the link aggregation group; and
   synchronizing the first MAC address with the other NVE devices of the plurality of NVE devices, thereby allowing each of the plurality of NVE devices to learn the first MAC address.

3. The method of claim 2, wherein synchronizing the first MAC address further comprises:
   searching the other NVE devices to find NVE devices whose domain identifier is same as a domain identifier of the first NVE device, wherein the domain identifier is allocated to the plurality of NVE devices by the NVA device; and
   distributing the first MAC address to the found NVE devices.

4. The method of claim 1, wherein the encapsulated packet includes a virtual network instance (VNI) indicating a type for the de-capsulated Ethernet packet.

5. The method of claim 4, wherein the VNI corresponds to a multicast MAC forwarding table,
   and wherein the port for forwarding the de-capsulated Ethernet packet is determined according to the VNI.

6. The method of claim 4, wherein the VNI indicates that the de-capsulated Ethernet packet is from a remote NVE device.

7. The method according to claim 1, wherein the plurality of NVE devices are simultaneously accessible by a server via the link aggregation group.

8. The method according to claim 1, wherein a respective NVE device of the plurality of NVE devices is assigned a device-specific IP address distinct from the IP address for the virtual NVE device.

9. The method of claim 1, further comprising pre-assigning a domain identifier for the plurality of NVE devices based on the link aggregation group, wherein the ports in the link aggregation group are configured with the domain identifier.

10. A network virtualization authority (NVA) device, comprising a processor and a memory on which is stored machine readable instructions of a forwarding packet logic that when executed by a processor cause the processor to perform a method, the method comprising:
   controlling, by the NVA device, a set of network virtualization edge (NVE) devices based on a network layer virtualization protocol;
   generating a virtual NVE device for a link aggregation group and assign an Internet protocol (IP) address for the virtual NVE device, wherein the link aggregation group comprises ports of a plurality of NVE devices in the set of NVE devices; and
   distributing the IP address to the ports of the plurality of NVE devices in the link aggregation group, thereby allowing each of the plurality of the NVE devices to encapsulate an Ethernet packet, which is received from a port of the ports in the link aggregation group and to be sent to an IP backbone network, and de-capsulate an encapsulated packet sent from IP backbone network and send the de-capsulated Ethernet packet through a port of the ports in the link aggregation group,
   wherein the ports in the link aggregation group are configured with the IP address.

11. The NVA device of claim 10, wherein the method further comprises:
   receiving, by the NVA device, a first media access control (MAC) address learned by a first NVE device of the plurality of NVE devices, wherein the first MAC address learned from a port in the link aggregation group; and
   synchronizing the first MAC address with the other NVE devices of the plurality of NVE devices, thereby allowing each of the plurality of NVE devices to learn the first MAC address.

12. The NVA device of claim 11, wherein synchronizing the first MAC address further comprises:
   searching the other NVE devices to find NVE devices whose domain identifier is same as a domain identifier of the first NVE device, wherein the domain identifier is allocated to the plurality of NVE devices by the NVA device; and
   distributing the first MAC address to the found NVE devices.

13. The NVA device of claim 10, wherein the encapsulated packet includes a virtual network instance (VNI) indicating a type for the de-capsulated Ethernet packet.

14. The NVA device of claim 13, wherein the VNI corresponds to a multicast MAC forwarding table,
   and wherein the port for forwarding the de-capsulated Ethernet packet is determined according to the VNI.

15. The NVA device of claim 13, wherein the VNI indicates that the de-capsulated Ethernet packet is from a remote NVE device.

16. The NVA device of claim 10, wherein the plurality of NVE devices are simultaneously accessible by a server via the link aggregation group.

17. The NVA device of claim 10, wherein a respective NVE device of the plurality of NVE devices is assigned a device-specific IP address distinct from the IP address for the virtual NVE device.

18. The NVA device of claim 10, wherein the method further comprises pre-assigning a domain identifier for the plurality of NVE devices based on the link aggregation group, wherein the ports in the link aggregation group are configured with the domain identifier.

* * * * *